United States Patent Office 2,693,026
Patented Nov. 2, 1954

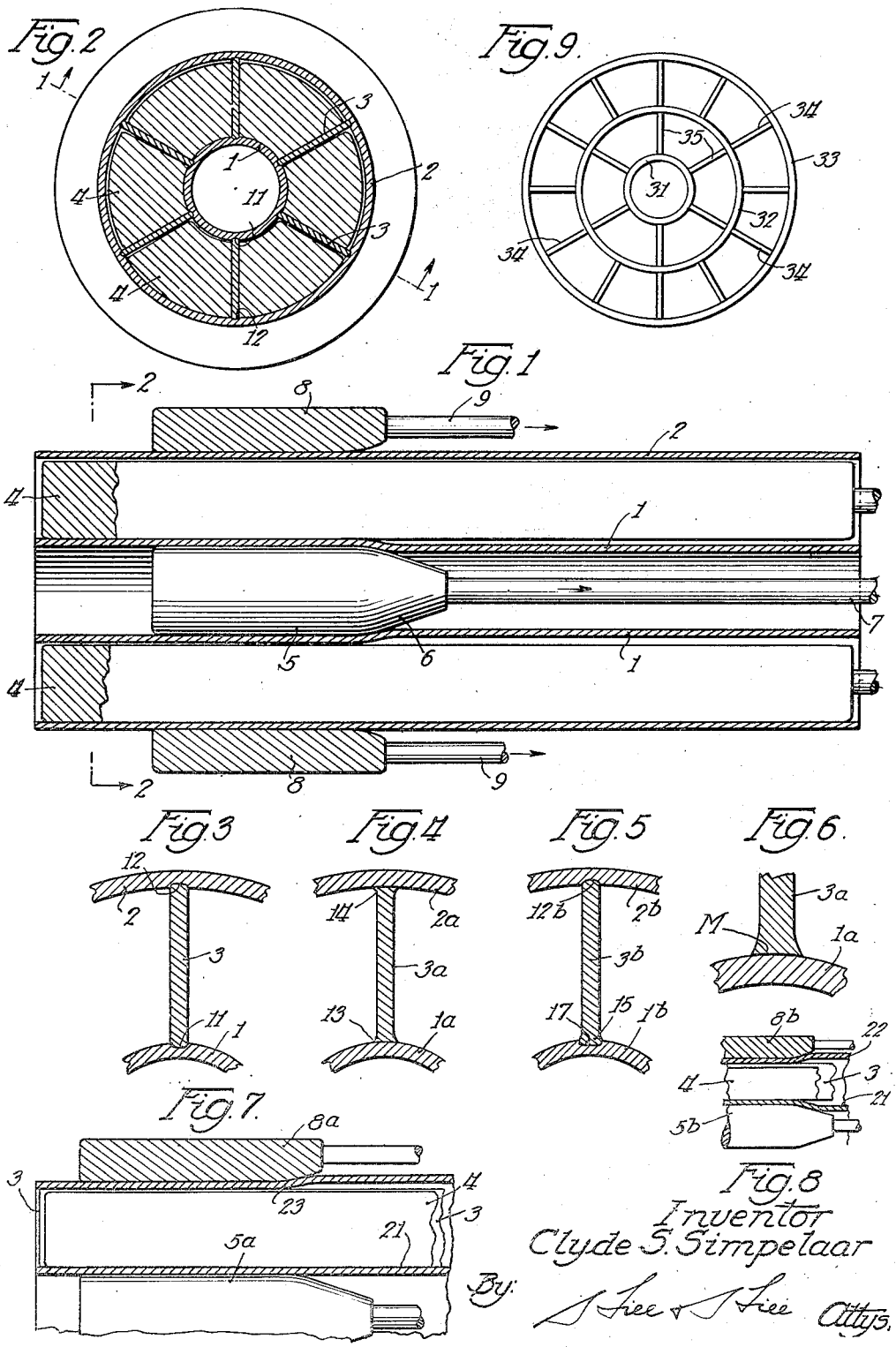

2,693,026

METHOD OF MAKING CONCENTRIC TUBES WITH RADIAL FINS

Clyde S. Simpelaar, Racine, Wis., assignor to Modine Manufacturing Company, Racine, Wis., a corporation of Wisconsin Application February 17, 1950, Serial No. 144,771

8 Claims. (Cl. 29—157.3)

The invention relates generally to radially-finned tubes, or the like, and more particularly to a novel construction of such radially-finned tubes, and the method of fabricating the same.

The invention has among its objects the production of a radially-finned tube structure embodying two or more concentric tubes connected by a plurality of axially-extending fin members secured to the respective tubes to form an integral structure in which the fin members are, in effect, mechanically interlocked with, as well as bonded to the tubes, if desired, thus providing a very durable and efficient structure.

Another object of the invention is the utilization of a novel method of fabricating heat exchange surface of the type referred to, which method is relatively simple, inexpensive, and very efficient for the purposes intended.

A further object of the invention is the utilization of such a method by means of which accurate control of the finished article may be achieved, which method requires a minimum amount of equipment, such as jigs, and the like, for maintaining the elements in their respective positions prior to the bonding operation, whereby elements of the structure are self-supporting during the bonding operation.

A further object of the invention is the utilization of such a method wherein little or no foreign bonding material is required, the various elements being fused together so that the resulting structure is substantially homogeneous without sharply defined joints.

A further object of the invention is the utilization of such a method whereby external pressure in connection with the fusion bonding of the elements is eliminated, pressure being obtained from inherent stresses in the structure itself set up therein prior to the application of heat to the structure.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, where like reference characters indicate like or corresponding parts:

Fig. 1 is a longitudinal sectional view through a heat exchange structure of the type described during the fabrication thereof, and taken approximately on the line 1—1 of Fig. 2;

Fig. 2 is a transverse sectional view taken approximately on the line 2—2 of Fig. 1;

Fig. 3 is a fragmentary, transverse, sectional view of a portion of such a structure prior to the bonding operation, only a single fin member being illustrated;

Fig. 4 is a sectional view similar to Fig. 3, illustrating a modified form of construction;

Fig. 5 is a sectional view similar to Fig. 3, illustrating still another modified form of construction;

Fig. 6 is a fragmentary, transverse, sectional view of a portion of a tube and one of the fin members prior to the bonding operation;

Fig. 7 is a fragmentary sectional view similar to Fig. 1, illustrating a modification of the subject matter of Fig. 1;

Fig. 8 is a similar longitudinal sectional view illustrating still another modification; and Fig. 9 is an end elevational view of a heat exchange structure similar to that illustrated in Fig. 2, but embodying three concentric tubes.

The present invention is particularly directed to a heat exchanger surface embodying two or more concentric tubes, the annular space or spaces between the respective tubes having a plurality of flat fin members or strips positioned therein, the respective fin members each lying in a radially-extending plane containing the axis of the tubes, with the fin members being bonded along their longitudinal edges to the respective adjacent tubes. Such tubular heat exchange surface may be constructed in relatively small diameters and relatively long lengths, as for example, diameters as small as one inch or less, and in continuous lengths of twenty feet or more. It will be apparent that the positioning and securing of continuous lengths of fin members between a pair of concentric tubes of the diameters and lengths above referred to presents numerous problems in connection with the positioning and bonding of the fin member and tubes into an integral structure. The present invention contemplates the utilization of a novel method wherein the fin members are initially positioned in the desired relationship with respect to the concentric tubes, after which one or both of the tubes are deformed adjacent the junctures of the fin members, with the respective tubes to simultaneously interlock the tube and fin members together, and place the fin members under compression stresses. A self-supporting structure is thus formed, which, if desired, may then be heated for the additional bonding of the elements, with the compression stresses set up in the fin members being utilized in the bonding operation whereby a fusion bond between the elements may be produced. The use of such method thus enables the performance of the heating and bonding operation without the use of jigs or fixtures to maintain the elements of the structure in their desired relative positions during the bonding operation, as well as the production of a fusion bond without the application of external pressure on the structure during the bonding operation.

Referring to Figs. 1 and 2, 1 indicates an inner tubular member concentrically positioned with respect to an outer tubular member 2, with the annular space between the members 1 and 2 having a plurality of flat fin members or strips 3, each positioned in a radially extending plane containing the axis of the tubular members 2. As illustrated in Fig. 2, the longitudinal edges of the fin members 3 are engaged with the respective tubular members and, in the finished structure, may be suitably bonded to the tubular members, thus forming an integral structure in which the inner tube 1 forms one fluid pass or passage, and the annular space between the member 1 and member 2 forms a pass for a second fluid, the latter pass having a plurality of fin members extending thereacross, which also provide means for supporting the inner tube in its concentric relation to the outer tube.

The above structure is fabricated in the following manner. The tubes 1 and 2 are preferably formed from the same basic material, as for example, copper, as are the fin members 3, and following the positioning of the inner tube 1 in concentric relation with the outer tube 2, the fin members 3 are inserted in the annular space between the two tubular members, with the fin members being supported in their desired relative positions by a mandrel having segments 4 positioned between the inner and outer tube and the fin members, as clearly illustrated in Fig. 2. The radial thickness of each mandrel segment 4 is less than the radial distance between the two tubes in the finished structure, with the segments being of suitable length to accomplish the desired results.

In the construction illustrated in Fig. 1, the inner tube 1 is then expanded outwardly a sufficient distance to place the fin members 3 under compression, this being accomplished by drawing a suitable forming tool 5 through the inner tube 1, the member 5 being cylindrical and having a conical or tapered leading end 6. The diameter of the cylindrical body of the tool 5 is of greater diameter than the initial diameter of the tube 1 by an amount sufficient to give the desired degree of expansion as the tool passes through the tube, movement of the tool being accomplished, for example, by means of a rod 7, to which is secured the tool 5. A retaining die sleeve 8 is preferably moved along the outer tube 2 simultaneously with passage of the tool 5 through the inner tube 1, with the die 8 being positioned radially opposite the tool 5 during such passage, as illustrated in Fig. 1. The sleeve 8 may likewise be actuated by rods 9, or other suitable means. While the mandrel segments 4 may be co-extensive in length with the tubes 1 and 2, whereby such segments could remain stationary during the expansion of the tube 1, the mandrel segments may be relatively short and moved through the annular space between the tubes 1 and 2 simultaneously with movement of the members 5 and 8, in which case the length of the segments is merely sufficient to insure proper positioning of the fin members or strips 3 at the point of deformation of the inner tube 1, thereby assuring accurate alignment of the fin members in the assembled structure. The amount of deformation of the tube 1 is such that an interlock between the edges of the fin members and the respective tubes is achieved, the nature of the interlock depending, among other things, upon the characteristics of the metal forming the respective tubes and fin members. For example, assuming the tubes and fin members are constructed of copper, if the copper of the fin members is harder than the copper of the tubes 1 and 2, sufficient expansion of the tube 1 will result in a structure similar to that illustrated in Fig. 2, wherein the harder fin strips will be indented into the respective tubes, in effect forming channels or grooves 11 in the inner tube 1, and similar channels or grooves 12 in the tube 2. This construction is illustrated on an enlarged scale in Fig. 3, wherein the fin member 3 is of harder metal than the inner tube 1 and outer tube 2, so that upon expansion of the inner tube, the channels or grooves 12 are formed in the respective tubes 1 and 2, thus mechanically interlocking the fins and tubes together. By varying the relative hardness of the fin and tube members, the form of interlock may be modified, examples of such modifications being illustrated in Figs. 4 and 5. One modified form of interlock is illustrated in Fig. 4, wherein the fin member 3a is of relatively softer metal than the inner tube 1a and outer tube 2a, the two tubes being constructed of metal of substantially the same hardness, and as the fin is of relatively softer metal, it will be deformed rather than indent or recess the tube walls, thus forming mushroomed or flared end portions 13 and 14 adjacent the respective tubes 1a and 2a, and as the abutting edge of the mushroomed portion 13 is concave, and the abutting edge of the portion 14 convex, with both of such edges under compression forces, the fin member is securely held in the desired position relative to the tubes, and any tendency of the fin member to pivot at either of the abutting edges out of engagement with the tubes is eliminated.

In both of the forms illustrated in Figs. 3 and 4, the respective pairs of tubes are constructed of metal of substantially the same degree of hardness, with the fin member illustrated in Fig. 3 being harder than the two tubes, while in Fig. 4 the fin member is softer than the two tubes associated therewith. Fig. 5 illustrates a construction where both tube members differ in degree of hardness, the inner tube 1b being of substantially the same degree of hardness as the fin 3b, and outer tube 2b being softer than either the fin member or the inner tube. Upon the application of compressive forces to the fin member 3b, the latter will indent the outer tube 2b to form a channel 12b, with the tube 1b and adjacent end of the fin member 3b each partially deformed, so that the edge portion 15 is mushroomed slightly, and the tube 1b indented slightly to form a relatively shallow channel 17.

While I have illustrated in Figs. 1 and 2 the inner tube 1 being expanded during the process of fabrication, either or both tubes may be deformed, such constructions being illustrated in Figs. 7 and 8, respectively, with the former figure disclosing contraction of the outer tube, and the latter figure disclosing simultaneous expansion of the inner tube and contraction of the outer tube. In the construction illustrated in Fig. 7, the diameter of the member 5a is merely slightly less than the initial internal diameter of the inner tube 21, whereas the internal diameter of the forming die 8a is less than the initial diameter of the outer tube 22. Thus, if the members 5a and 8a are drawn along the tubes, the outer tube 22 is contracted, as indicated at 23, to place the fin members 3 under compression, with the interlock formed depending upon the relative degrees of hardness of the tubes and fins. The construction illustrated in Fig. 8 employs an inner tool 5b having a diameter greater than the initial diameter of the inner tube 21, in conjunction with an outer member 8b having an internal diameter less than the initial external diameter of the outer tube 22, whereby passage of the members 5b and 8b along the tube will result in an expansion of the inner tube 21, and a contraction of the outer tube 22. Where it is desired to indent one of the tubes, and otherwise deform the fin member and other tube, as for example, the construction illustrated in Fig. 5, the obtaining of desired results will depend, not only on the relative degrees of hardness of the various elements, but also upon the particular tube or tubes to be deformed. For example, in the construction illustrated in Fig. 5, to achieve the desired interlock between the fin member 3b and the inner tube 16, it may be desirable to merely expand the inner tube without contracting the outer tube. Thus the formation of the particular interlock desired may be controlled by the selection of the tube to be deformed, as well as by the relative hardness of the elements. Obviously, by means of such control any desired combination of the interlocks illustrated may be produced between the fin members and the respective tubes.

It will be apparent that, after the tube or tubes have been deformed, the resulting structure is self-supporting and is quite rugged, whereby such structure may be readily handled without danger of disconnection of the fins with the respective tubes. In fact, in some applications of this type of exchanger, the fin members may be put under sufficient compression stresses to eliminate the need of further securement. While common forms of bonding may be employed to provide securement of the fin members, the structure above described is particularly adapted to fusion bonding, wherein the structure is heated to a sufficient temperature to create the formation of crystals of the metal composing the fin members and tubular members across their abutting surfaces, the pressure required, in conjunction with the heating of the structure, being provided by the compression stresses set up during the fabrication of the interlocks. To assure efficient bonding action, the abutting surfaces of the fins and tubes are cleaned, prior to their assembly, by suitable methods and means to insure clean butting surfaces. To facilitate the forming of the crystals during the bonding operation where the structure is composed of non-ferrous metals, such as copper and brass, the abutting surfaces may be coated with a catalyst material which can be accomplished by coating the edges of the fins with the desired material, as for example, a mercury amalgam, prior to their assembly in the tubes, thus forming a light amalgam film amalgamated in turn with the bonding material. Upon application of pressure to the fin edges during the deformation of the tube or tubes, the softer amalgam surface M, as illustrated in Fig. 6, would be compressed to give a complete metal contact without any voids, and essentially free of foreign substances. During the bonding operation, preferably under protective atmospheric conditions, the mercury would be vaporized and substantially eliminated from the joint, having performed its function of maintaining clean metal surfaces prior to the bonding action, and encouraging the growth of parent metal crystals across the juncture of the elements. Such action is, of course, also assisted by the initial stressing of the parts, which stress is greatly localized at the juncture, resulting in highly stressed metal crystals at the interface, with a resultant tendency for the crystals to regrow and change orientation to assist the crystal growth across such juncture.

The utilization of the above method of fabrication is also of particular advantage where the use of an additional bonding material is desired. For example, the edges of the fins may be provided with a very light coating of metal, which would be generally softer than the parent metal and preferably applied either by tinning, plating, or the like, the elements being suitably cleaned prior to the application of such metal to the elements. Thus, when the fin members are interlocked by deforming one or both tubes, the softer bonding material would tend, under pressure to conform to the abutting surfaces, much like a soft gasket, to produce a practically complete contact without voids between abutting surfaces. In the subsequent heating of the structure, the bonding material will melt and completely alloy with the parent or base metal, so that the resulting joint is bonded with an alloy of entirely different characteristics, and generally substantially stronger than the bonding material originally applied to the elements. If bonding material such as tin is employed in this manner, it would normally have greater oxidation resistance than the metal of the fins and tubes, and the resulting bond would have a minimum amount of foreign material included therein.

It will be particularly noted that the use of the present invention permits the use of the bonding material merely for the purpose of facilitating the growth of the crystal structure across the abutting surfaces of the tubes and fins, as a result of which the amount of bonding material can be reduced to an extreme minimum, so that the original bonding material is practically non-apparent to the finished structure. It will be noted that the function of the tin is similar to that of the mercury previously described, with the difference being that, whereas the mercury is almost completely dissipated from the finished bond, the small amount of tin, or other bonding metal, is practically completely dispersed into and alloyed with the parent metal. It will be apparent from the above that the amount of bonding material incorporated in the joint may be readily controlled by varying the coating thickness to produce a pre-determined alloy in the bond. It will be noted that basically the action of the mercury amalgam is similar to that of a catalyst rather than that of a securing means.

As illustrated in Fig. 9, the invention is also applicable to tubular heat exchange surfaces of the type described, embodying more than two concentric tubes. In the illustrative construction, the outer tube 33, intermediate tube 32, and fin members 34 are assembled and interlocked, as heretofore described, after which the inner tube 31 and fin members 35 could be assembled in a successive operation in which the entire outer assembly may be treated as an outer tube, and the inner tube 31 expanded as illustrated in Figs. 1 and 2. Upon completion of the interlocking of the respective fins and tubular members, the assembled structure may be bonded as above described. In employing a three-tube structure such as that illustrated in Fig. 9, the fin elements 35 are preferably each aligned with a corresponding fin member 34 to eliminate distortion stresses on the intermediate tube during the deformation of the inner tube 31.

It will be noted from the above description that I have provided a novel exchanger structure wherein the elements are mechanically interlocked to provide a very durable and efficient structure, as well as the utilization of a novel method of bonding the same together, whereby the elements may be fusion bonded, with the pressures required therefor being attained by the initial stresses of the elements themselves prior to the bonding operation, thus eliminating the need for the mechanical application of pressure during the bonding operation. It will also be noted that by utilizing the method herein shown and described, accurate control of the finished structure may be readily accomplished.

Having thus described my invention, it is obvious that various immaterial modifications may be made in the same without departing from the spirit of my invention; hence, I do not wish to be understood as limiting myself to the exact method or form, construction, arrangement, and combination of parts herein shown and described or uses mentioned.

What I claim as new and desire to secure by Letters Patent is:

1. The method of fabricating a plurality of concentric elongated tubular members and longitudinally extending individual plate-like fin members into an integral structure, comprising assembling said fin members between said concentric tubular members and radially of the axes thereof, supporting said fin members between mandrel members having a dimension less than the distance between said concentric tubular members after fabrication at substantially the plane of deformation while deforming one or more of said elongated tubular members to place said fin members under compression stresses and form a self-supporting structure, and heating said assembled structure to a sufficient temperature to cause fusion bonding of the tubular members and fin members under such compression stresses.

2. The method of fabricating a plurality of concentric elongated tubular members as claimed in claim 1, including the step of coating the concentric tubular members with a metal prior to their assembly with said fin members.

3. The method of fabricating a plurality of concentric elongated tubular members as claimed in claim 1, including the step of coating the longitudinally extending fin members with a metal prior to their assembly with said tubular members.

4. The method of fabricating a plurality of concentric elongated tubular members as claimed in claim 1, wherein the assembly includes at least three tubular members.

5. The method of fabricating a plurality of concentric elongated tubular members as claimed in claim 1, including the step of coating the concentric tubular members and the fin members with a metal prior to their assembly.

6. The method of fabricating a plurality of concentric elongated tubular members as claimed in claim 2, wherein the coating metal is tin.

7. The method of fabricating a plurality of concentric elongated tubular members as claimed in claim 3, wherein the coating metal is tin.

8. The method of fabricating a plurality of concentric elongated tubular members and longitudinally extending individual plate-like fin members into an integral structure, comprising assembling said fin members between said concentric tubular members and radially of the axes thereof, simultaneously supporting said fin members between mandrel segments having a radial thickness less than the radial distance between the concentric tubular members after fabrication in predetermined radial relationship about the inner tubular member, the radial width of said fin members being slightly less than the radial distance between the opposed surfaces of the respective tubes, uniformly expanding the inner tubular member toward the outer tubular member a distance sufficient to place all of said fin members under compression and form a self-supporting structure, thus bonding the fin strips to the respective tubes while so supported.

References Cited in the file of this patent

UNITED STATES PATENTS

| Number | Name | Date |
|---|---|---|
| 813,918 | Schmitz | Feb. 27, 1906 |
| 1,646,384 | Bergstrom | Oct. 25, 1927 |
| 1,813,096 | Stenner | July 7, 1931 |
| 1,833,876 | McGrath | Nov. 24, 1931 |
| 2,004,389 | Jones | June 11, 1935 |
| 2,150,233 | Martin | Mar. 14, 1939 |
| 2,261,136 | Brown, Jr. | Nov. 4, 1941 |
| 2,377,557 | Johnson | June 5, 1945 |
| 2,385,542 | Rippingille | Sept. 25, 1945 |
| 2,431,157 | Zelinka | Nov. 18, 1947 |
| 2,611,585 | Boling | Sept. 23, 1952 |

FOREIGN PATENTS

| Number | Country | Date |
|---|---|---|
| 17,085 | Great Britain | 1898 |